US 11,484,852 B2

(12) United States Patent
Morikawa et al.

(10) Patent No.: US 11,484,852 B2
(45) Date of Patent: Nov. 1, 2022

(54) ROTARY MIXER IN TWO-LIQUID MIXTURE INJECTION MACHINE

(71) Applicant: NIPPON SOSEY KOGYO CO., LTD., Nagoya (JP)

(72) Inventors: Norihiro Morikawa, Nagoya (JP); Yoshihito Kato, Nagoya (JP)

(73) Assignee: NIPPON SOSEY KOGYO CO., LTD., Nagoya (JP)

( * ) Notice: Subject to any disclaimer, the term of this patent is extended or adjusted under 35 U.S.C. 154(b) by 26 days.

(21) Appl. No.: 16/959,705

(22) PCT Filed: Mar. 5, 2019

(86) PCT No.: PCT/JP2019/008521
§ 371 (c)(1),
(2) Date: Jul. 2, 2020

(87) PCT Pub. No.: WO2019/172223
PCT Pub. Date: Sep. 12, 2019

(65) Prior Publication Data
US 2021/0121838 A1  Apr. 29, 2021

(30) Foreign Application Priority Data

Mar. 5, 2018 (JP) .............................. JP2018-038729
Mar. 1, 2019 (JP) .............................. JP2019-037677

(51) Int. Cl.
*B01F 27/92* (2022.01)
*B01F 35/71* (2022.01)
*B29B 7/76* (2006.01)

(52) U.S. Cl.
CPC .............. *B01F 27/92* (2022.01); *B01F 35/71* (2022.01); *B29B 7/7636* (2013.01); *B29B 7/7647* (2013.01); *B29B 7/7652* (2013.01)

(58) Field of Classification Search
CPC ........ B01F 7/24; B01F 15/02; B01F 15/0203; B01F 7/241; B01F 7/00216; B01F 3/10;
(Continued)

(56) References Cited

U.S. PATENT DOCUMENTS 3,051,455 A * 8/1962 Magester .............. B01F 5/0656
366/172.1
5,106,198 A 4/1992 Müller
(Continued)

FOREIGN PATENT DOCUMENTS

JP   2008068206 A   3/2008
JP   2008221536 A   9/2008
(Continued)

OTHER PUBLICATIONS

International Search Report issued in corresponding International Application No. PCT/JP2019/008521 with English translation, dated Jun. 4, 2019 (4 pages).

(Continued)

*Primary Examiner* — Charles Cooley
(74) *Attorney, Agent, or Firm* — Flynn Thiel, P.C.

(57) ABSTRACT

Planetary gear mechanisms require internal toothed gears in housings. A drive rotor and driven rotors are accommodated in a mixing space in a housing, and chemical inflow paths to the mixing space are formed in an upper portion of the housing. A mixture outflow path is formed in a lower portion of the housing. The mixing space is formed to allow the drive rotor and the driven rotors to rotate and to regulate the positions of the drive rotor and the driven rotors. Meshing the drive rotor with the driven rotors allows the driven rotors to rotate opposite to the rotating direction of the drive rotor accompanying the rotation of the drive rotor while the lower ends of the driven rotors are located above a bottom portion (Continued)

of the mixing space and the upper ends of the driven rotors are located below the lower surface of the lid body.

14 Claims, 6 Drawing Sheets

(58) Field of Classification Search
CPC ...... B01F 7/166; B01F 3/0853; B01F 7/1665; B01F 27/92; B01F 35/71; B01F 23/43; B01F 23/47; B01F 27/092; B01F 27/84; B01F 27/922; B01F 35/712; B01F 27/85; B01F 33/86; B01F 33/862; B29B 7/7636; B29B 7/7647; B29B 7/7652; B29B 7/42; B29B 7/48; B29B 7/7605; B29B 7/401; B29B 7/407; B29B 7/76; B29C 39/22
USPC ......... 366/172.2, 176.1, 181.5, 325.1, 325.2, 366/326.1, 329.1, 329.222, 2, 145.5
See application file for complete search history.

(56) References Cited

U.S. PATENT DOCUMENTS

| | | | |
|---|---|---|---|
| 5,108,711 A | 4/1992 | Chszaniecki | |
| 2015/0290604 A1* | 10/2015 | Morikawa | B01F 7/00216 366/300 |
| 2021/0121838 A1* | 4/2021 | Morikawa | B29B 7/48 |

FOREIGN PATENT DOCUMENTS

| | | |
|---|---|---|
| JP | 2015202438 A | 11/2015 |
| WO | 83/02712 A1 * | 5/1983 |

OTHER PUBLICATIONS

Written Opinion of International Searching Authority issued in corresponding International Application No. PCT/JP2019/008521, dated Jun. 4, 2019 (4 pages).

* cited by examiner

FIG. 7

ROTARY MIXER IN TWO-LIQUID MIXTURE INJECTION MACHINE

TECHNICAL FIELD

The present invention relates to a rotary mixer in a multi-liquid mixture injection machine that mixes two types of chemicals and discharges the mixture, in casting, molding, painting, and the like.

BACKGROUND ART

There is available, as a conventional mixer including one drive rotor and a plurality of driven rotors and designed to mix two types of fluids, a mixer including one "central spindle" (to be referred to as the drive rotor hereinafter) and 12 "planet spindles" (to be referred to as the driven rotors hereinafter) and designed to inject two types of fluids into a "chamber" (to be referred to as the mixing space hereinafter) from a "bore 19, 16" (to be referred to as the chemical inflow path hereinafter) formed in an upper portion of a "housing" (to be referred to as the housing hereinafter) and discharge the mixed fluid from a lower portion of the housing (see, for example, U.S. Pat. No. 5,106,198) or a mixer including one "drive shaft" (to be referred to as the drive rotor hereinafter) and 10 "conveying shafts" (to be referred to as the driven rotors hereinafter) and designed to inject two types of fluids into a "chamber" (to be referred to as the mixing space hereinafter) from a "feed aperture" (to be referred to as the chemical inflow path hereinafter) and a "flange" (to be referred to as the chemical inflow path hereinafter) formed in an upper portion of a "housing" (to be referred to as the housing hereinafter) and discharge the mixed fluid from a lower portion of the housing (see U.S. Pat. No. 5,108,711).

SUMMARY

In the above conventional techniques, however, because the drive rotor and the driven rotors meshing with the drive rotor are of a so-called "planetary gear mechanism," internal toothed gears (see "10a'" in FIG. 4 in U.S. Pat. No. 5,106,198 and "24" in FIG. 3 in U.S. Pat. No. 5,108,711) need to be formed in the housings. This leads to problems, such as complication of the housing structure.

According to the present invention, in consideration of the problem that the planetary gear mechanisms require internal toothed gears in the housings based on the conventional techniques, one drive rotor and two driven rotors are accommodated parallel to each other in a housing, an upper opening portion of the housing is closed by a lid body, the housing has a mixing space that accommodates the drive rotor and the driven rotors, two chemical inflow paths are formed in an upper portion of the housing, with outlets being formed in an upper portion of the mixing space, an outflow path for a mixture is formed in a lower portion of the housing, the mixing space is formed so as to allow the drive rotor and the driven rotors to rotate and to be able to regulate positions of the drive rotor and the driven rotors, the drive rotor includes a drive rotor main body having a helical blade and a coupling portion integrally formed on an upper portion of the drive rotor main body and extending through the lid body, the driven rotors are each constituted by only a driven rotor main body having a helical blade, the helical blade is reversely rolled at the same pitch as a pitch of the helical blade of the drive rotor, the lid body closes an upper opening portion of the mixing space, a through hole of the coupling portion is formed in a center portion of the lid body, and the drive rotor is meshed with the driven rotors to allow the driven rotors to rotate in an opposite direction at fixed positions accompanying rotation of the drive rotor while a lower end of each of the driven rotors is located above a bottom portion of the mixing space and an upper end of each of the driven rotors is located below a lower surface of the lid body. This makes it possible for the driven rotors to rotate at fixed positions by only accommodating the driven rotors in the mixing space so as to mesh with the drive rotor without providing any means for maintaining the postures of the driven rotors within the mixing space in the housing, thereby solving the above problems.

That is, according to the present invention, one drive rotor and two driven rotors are accommodated parallel to each other in a housing, an upper opening portion of the housing is closed by a lid body, the housing has a mixing space that accommodates the drive rotor and the driven rotors, two chemical inflow paths are formed in an upper portion of the housing with outlets being formed in an upper portion of the mixing space, an outflow path for a mixture is formed in a lower portion of the housing, the mixing space is formed so as to allow the drive rotor and the driven rotors to rotate and to be able to regulate positions of the drive rotor and the driven rotors, the drive rotor includes a drive rotor main body having a helical blade formed extensively over a vertical direction and a coupling portion integrally formed on an upper portion of the drive rotor main body and extending through the lid body, the driven rotors are each constituted by only a driven rotor main body having a helical blade formed extensively over the vertical direction, the helical blade is reversely rolled at the same pitch of the helical blade as a pitch of the drive rotor, the lid body closes an upper opening portion of the mixing space, and a through hole of the coupling portion is formed in a center portion of the lid body. The mixer disclosed in U.S. Pat. No. 5,106,198 can mix only merged chemicals around the driven rotors because the driven rotors are widely spaced apart from the inner wall surface of the housing. The mixer disclosed in U.S. Pat. No. 5,108,711 can mix merged chemicals only in the lower region of the mixing space because a plurality of chemical inflow paths are formed in a lower position of the mixing space, even if the driven rollers can mix chemicals by themselves. The mixers disclosed in each of these two patents cannot uniformly mix two types of chemicals injected into the mixing space by the time when the chemicals are discharged from the lower portion of the housing, and hence cannot obtain a uniform mixture. In contrast, the mixer according to the invention can reliably agitate and mix two types of chemicals that are fed downward under pressure from an upside while filling the mixing space, by the three rotors, thereby efficiently mixing the chemicals and efficiently promoting curing of the mixture. This makes it possible to manufacture a product by using a proper amount of optimal materials.

The mixing space is formed so as to allow the drive rotor and the driven rotors to rotate and to be able to regulate positions of the drive rotor and the driven rotors, and the drive rotor is meshed with the driven rotors to allow the driven rotors to rotate in an opposite direction at fixed positions accompanying rotation of the drive rotor while a lower end of each of the driven rotors is located above a bottom portion of the mixing space and an upper end of each of the driven rotors is located below a lower surface of the lid body. Therefore, only accommodating the driven rotors in the mixing space while making the driven rotors mesh with the drive rotor can allow the driven rotors to rotate at the fixed positions. This can eliminate the necessity for any means for maintaining the accommodated postures of the driven rotors within the mixing space, and hence can simplify the shape of the housing.

The drive rotor main body and each driven rotor main body are formed by alternately and tandemly integrating clockwise helical elements and counterclockwise helical elements, with helical central axes being aligned with each other, and helical directions of elements of the drive rotor main body and each driven rotor main body at the same level are opposite to each other. When the merged chemicals pass the drive rotor main body and the driven rotor main bodies, dividing, turning, and reversing effects are exerted on the merged chemicals. This makes it possible to further efficiently mix the chemicals.

The rotating direction of the drive rotor is opposite to a rotating direction of the uppermost helical element. This temporarily pushes the chemicals upward immediately after being injected into the housing, thereby preventing the occurrence of an air pocket in the upper portion of the mixing space and also preventing the merged chemicals remaining in the mixing space after stoppage of rotation from vigorously flowing out. Accordingly, it is possible to keep the site environment in good condition.

The first chemical inflow path is formed so as to extend from an inlet in an outer side surface of the housing to an outlet formed in an upper central portion of the mixing space so as to allow a first chemical to be injected from above into an accommodation region for the drive rotor in the mixing space, and the second chemical inflow path is formed so as to extend from an inlet in the outer side surface of the housing to outlets formed on both sides of the upper portion of the mixing space, with a downstream portion branching into two portions, so as to allow a second chemical to be injected from above into accommodation regions for the driven rotors in the mixing space. This can instantly distribute two types of chemicals over the mixing space and mix the chemicals by the three rotors, thus providing significant practical effects, such as being able to further reliably agitate and mix the two types of chemicals.

DETAILED DESCRIPTION

Figure 7:
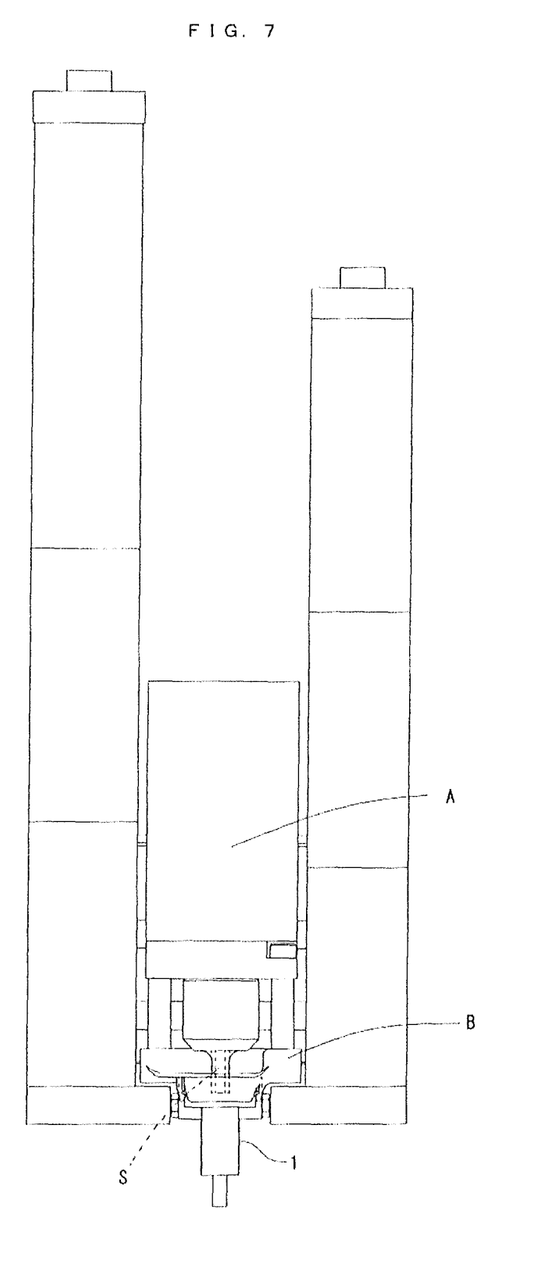
FIG. 7 is a longitudinal sectional view of a rotary mixer according to Example 3 of the present invention.

As shown in FIG. 7, a rotary mixer according to the present invention is fixed to a head portion B of a two-liquid mixture injection machine A, and basically includes a housing 1, one drive rotor 2 and two driven rotors 3 and 3a accommodated parallel to each other in the housing 1, and a lid body 4 that closes an upper opening portion of the housing 1.

The housing 1 includes a mixing space 5 accommodating the drive rotor 2 and the driven rotors 3 and 3a and an accommodation space 6 for the lid body 4.

The mixing space 5 is formed so as to allow the drive rotor 2 and the driven rotors 3 and 3a to rotate and to be able to regulate the positions of the drive rotor 2 and the driven rotors 3 and 3a.

The drive rotor 2 includes a drive rotor main body 8 having helical blades 7, 7a and a coupling portion 9 that is integrally formed on an upper portion of the drive rotor main body 8 and can be coupled to the lower end of a drive shaft S on the head portion (not shown) side upon extending through the lid body 4.

Each of the driven rotors 3 and 3a is constituted by only a driven rotor main body 11 having helical blades 10, 10a. The driven rotor main body 11 has a shape mirror-symmetrical to the drive rotor main body 8. The helical blades 10, 10a are reversely rolled at the same pitch as that of the helical blades 7, 7a of the drive rotor 2. Meshing the helical blades 10, 10a with the helical blades 7, 7a allows the driven rotors 3 and 3a to rotate reversely accompanying the rotation of the drive rotor 2.

The lid body 4 is fitted in the accommodation space 6 to close the upper opening portion of the mixing space 5, and a through hole 12 for the coupling portion 9 of the drive rotor 2 is formed in a central portion of the lid body 4.

Two chemical inflow paths 13 and 13a are formed in an upper portion 1a of the housing 1 so as to form outlets in an upper portion of the mixing space 5, and a mixture outflow path 14 is formed in a lower portion of the housing 1.

The first chemical inflow path 13 is formed so as to extend from an inlet in the outer side surface of the housing 1 to the outlet in an upper central portion of the mixing space 5 so as to allow a first chemical to be injected from above into the region of the drive rotor 2 in the mixing space 5. The second chemical inflow path 13a is formed so as to extend from an inlet in the outer side surface of the housing 1 to the outlets on both sides of the upper portion of the mixing space 5, with the downstream portion branching into two portions, so as to allow a second chemical to be injected from above into the regions of the driven rotors 3 and 3a in the mixing space 5. This enables the drive rotor 2 and the driven rotors 3 and 3a to mix two types of chemicals while the mixing space 5 is filled with the chemicals.

Example 1

As shown in FIGS. 1 to 4, a rotary mixer according to the present invention includes a plastic housing 1, a plastic drive rotor 2 located in the middle and plastic driven rotors 3 and 3a having the same diameter as that of the drive rotor 2 and located on both sides of the drive rotor 2, which are arranged side by side, and a plastic lid body 4.

Figure 5:
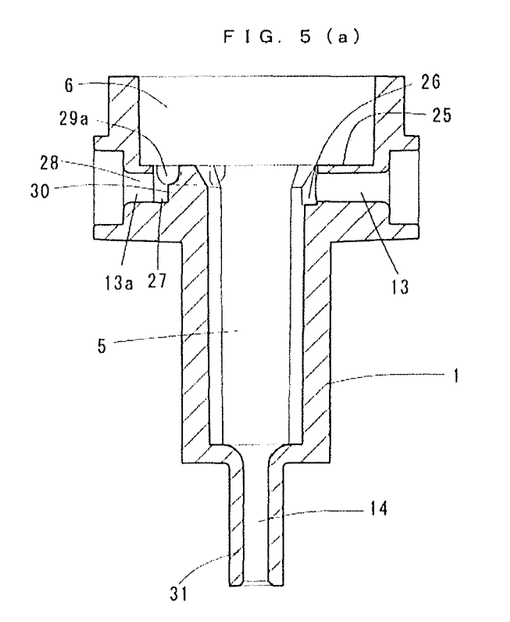
FIG. 5(a) is a longitudinal sectional view of the middle portion of a housing.
FIG. 5(b) is a longitudinal sectional view of the middle portion of the housing.

As shown in FIGS. 5(a) and 5(b), in the housing 1, an accommodation space 6 for the lid body 4 is formed into a flat cylindrical space concentric with the center of a mixing space 5, with the diameter being larger than the longitudinal width of the mixing space 5.

Figure 1:
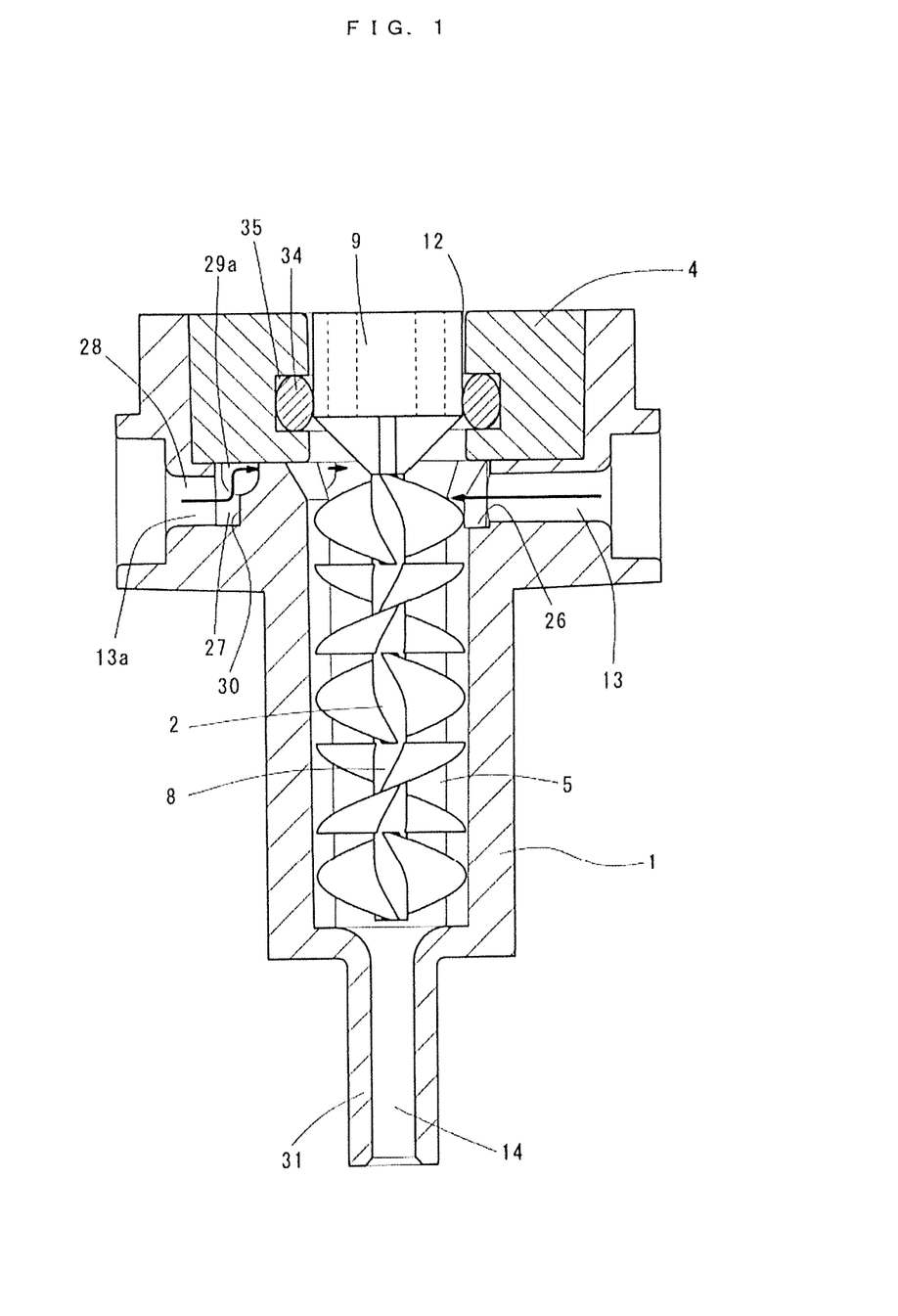
FIG. 1 is a longitudinal sectional view of the middle portion of a rotary mixer according to the present invention.
Figure 2:
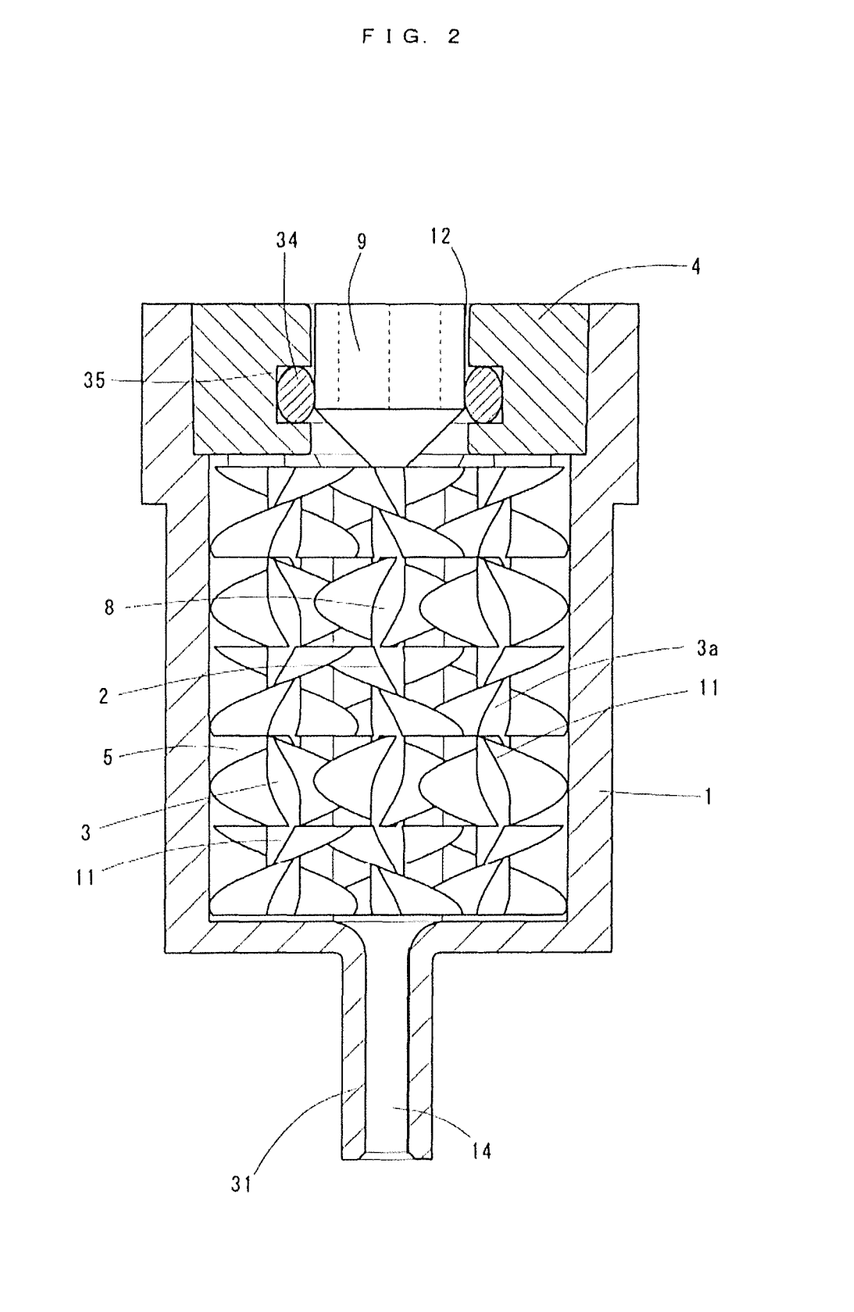
FIG. 2 is a transverse sectional view of the middle portion of the rotary mixer in FIG. 1.
Figure 3:
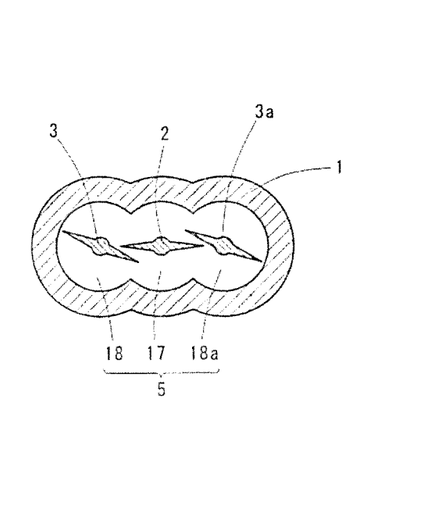
FIG. 3 is an end view of a horizontal section of the rotary mixer in FIG. 1.
Figure 4:
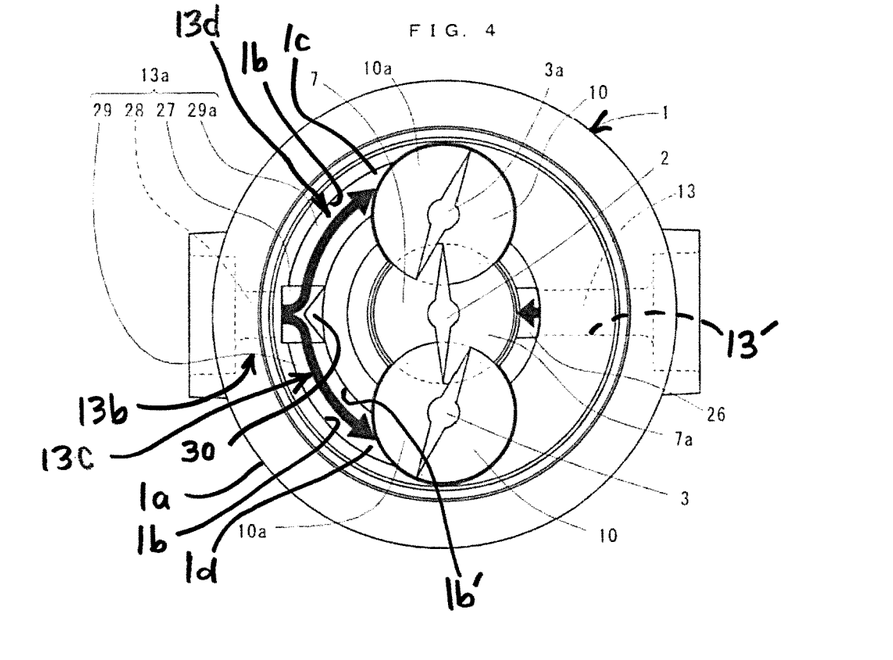
FIG. 4 is a plan view showing a state in which a lid body is removed from the rotary mixer in FIG. 1.

As shown in FIG. 3, the mixing space 5 is formed such that three cylindrical spaces 17, 18, and 18a, each having a slightly larger diameter than the drive rotor 2 and the driven rotors 3 and 3a, are arranged side by side while partly overlapping each other.

Figure 6A:
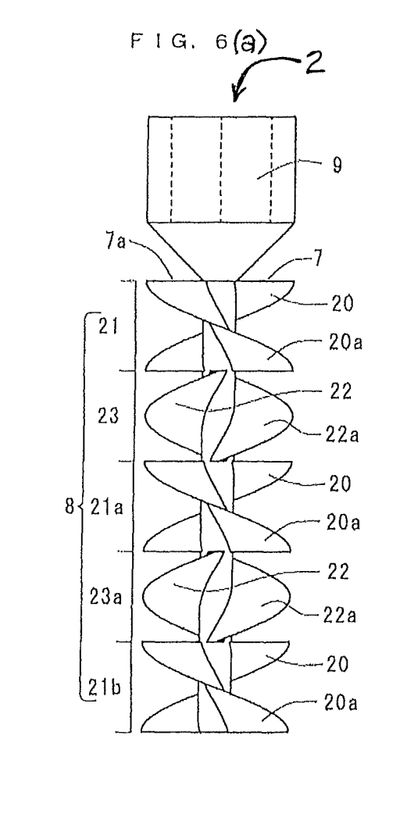
FIG. 6(a) shows a front view of a drive rotor.

As shown in FIG. 6(a), the drive rotor 2 includes a drive rotor main body 8 obtained by integrating three counterclockwise helical elements 21, 21a, and 21b each having two helical blade members 20 and 20a turned clockwise through 180° and two clockwise helical elements 23 and 23a each having two helical blade members 22 and 22a turned counterclockwise through 180° upon alternately and tandemly arranging the helical elements in the helical axis direction at angular intervals of 90°, and a coupling portion 9 on an upper portion of the drive rotor main body 8.

An assembly of the helical blade members 20 of the counterclockwise helical elements 21, 21a, and 21b and the helical blade members 22 of the clockwise helical elements 23 and 23a is provided as a first helical blade 7. In addition, an assembly of the helical blade members 20a of the counterclockwise helical elements 21, 21a, and 21b and the helical blade members 22a of the clockwise helical elements 23 and 23a is provided as a second helical blade 7a.

Figure 6B:
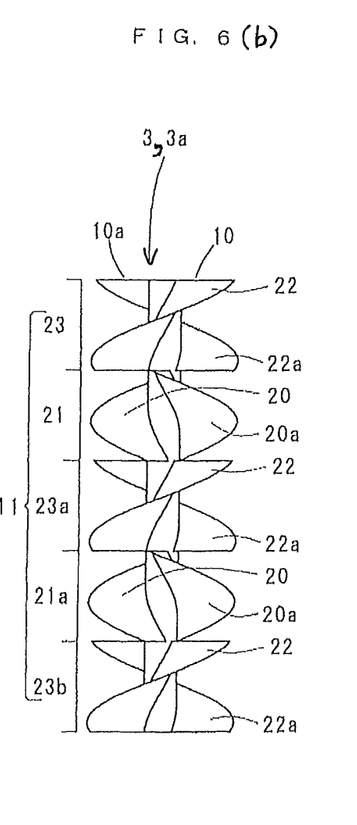
FIG. 6(b) shows a front view of a driven rotor.

As shown in FIG. 6(b), the driven rotors 3 and 3a are each formed from only a driven rotor main body 11 constituted by only three clockwise helical elements 23, 23a, and 23b and two counterclockwise helical elements 21 and 21a so as to be mirror-symmetrical with respect to the drive rotor main body 8 of the drive rotor 2.

An assembly of helical blade members 22 of the clockwise helical elements 23, 23a, and 23b and helical blade members 20 of the counterclockwise helical elements 21 and 21a is provided as a first helical blade 10. In addition, an assembly of helical blade members 22a of the clockwise helical elements 23, 23a, and 23b and helical blade members 20a of the counterclockwise helical elements 21 and 21a is provided as a second helical blade 10a.

Preferably, the drive rotor 2 is caused to rotate, by a drive shaft S, in a direction opposite to the helical direction of the uppermost element (the counterclockwise helical element 21 in FIG. 6(a)), and the driven rotors 3 and 3a also rotate in a direction opposite to the helical direction of the uppermost element (the clockwise helical element 23 in FIG. 6(b)) accompanying the rotation of the drive rotor 2 so as to prevent the occurrence of an air pocket in an upper portion of the mixing space 5 by temporarily pushing chemicals upward immediately after being injected into the housing 1.

A first chemical inflow path 13 is defined by an inner wall 13' of the upper portion 1a of the housing 1 and is a linear horizontal hole having an inlet in the outer side surface of the housing 1 and an outlet in a central upper portion of the mixing space 5. The first chemical inflow path 13 has an outlet formed in an uprising surface of a concave portion 26 formed at a rim portion of the middle cylindrical space 17 in a boundary stepped portion 25 between the mixing space 5 and the accommodation space 6.

The second chemical inflow path 13a is formed from a concave portion 27 formed between an inner wall or inner wall surface 1b of the housing 1 and the middle cylindrical space 17 at a position on the opposite side to the formation position of the concave portion 26 in the boundary stepped portion 25 between the mixing space 5 and the accommodation space 6, a linear horizontal hole 28 having an inlet formed on the opposite side to the inlet of the first chemical inflow path 13 of the housing 1 and an outlet in the concave portion 27, grooves 29 and 29a formed so as to extend from both side portions of the concave portion 27 in the boundary stepped portion 25 to respective downstream ends 1c and 1d located adjacent the respective cylindrical spaces 18 and 18a (located on opposite sides of the middle cylindrical space 17), and the lid body 4 is in tight contact with the boundary stepped portion 25. The grooves 29 and 29a are defined by respective inner walls 1b and 1b' of the upper portion 1a of the housing 1.

A diverting protrusion portion 30 having a triangular horizontal section is formed on a surface facing the surface, of the second concave portion 27, in which the outlet of the horizontal hole 28 is formed. This makes it easy to divert the second chemical flowing from the horizontal hole 28 into the concave portion 27.

The second chemical inflow path 13a has an upstream portion 13b which includes the horizontal hole 28 and downstream portions 13c and 13d formed by the respective grooves 29 and 29a.

A mixture outflow path 14 is formed to vertically extend through a nozzle attachment 31 protruding downward from the center of the lower portion of the housing 1. This makes it possible to discharge a mixture out of the mixing space 5.

A groove 35 for an O-ring 34 is formed in an intermediate portion of a through hole 12 for the lid body 4. The O-ring 34 accommodated in the groove 35 is brought into tight contact with the outer circumferential surface of the coupling portion 9 while being elastically deformed. This makes it possible to maintain a sealing function for chemicals while keeping the drive rotor 2 rotatable.

The lid body 4 is in tight contact with the boundary stepped portion 25 and the inner surface of the housing 1 while being fitted in the accommodation space 6.

Note that the drive rotor main body 8 and the driven rotor main body 11 are preferably formed from composites of the plurality of counterclockwise helical elements 21, 21a, . . . and the plurality of clockwise helical elements 23, 23a, . . . . However, for example, although not shown in any drawing, each main body may be a single body having a helical blade integrally formed so as to be continuous extensively over the vertical direction.

As shown in the drawings, the mixing space 5 is formed by arranging the three cylindrical spaces 17, 18, and 18a side by side so as to make them partly overlap. For example, although not shown, the longitudinal width of a mixing space 5 may be set to allow minute gaps to be formed with respect to the opposite ends of the driven rotors 3 and 3a, and the transverse width of the mixing space 5 may be set to allow minute gaps to be formed with respect to the drive rotor 2 and the driven rotors 3 and 3a so as to have a racetrack-shaped section.

The operation of the rotary mixer according to the present invention will be described next.

When the drive rotor 2 rotates, the driven rotors 3 and 3a rotate in the opposite direction accompanying the rotation of the drive rotor 2. Consequently, two types of chemicals fed under pressure by chemical pressure-feeding means (not shown) connected to the inlets of the chemical inflow paths 13 and 13a of the housing 1 flow together in the mixing space 5.

More specifically, a first chemical is injected from above from the first chemical inflow path 13 into the middle cylindrical space 17 through the first concave portion 26. A second chemical is then injected from above into the side cylindrical spaces 18 and 18a through the horizontal hole 28, the second concave portion 27, and the grooves 29 and 29a, which constitute the second chemical inflow path 13a.

The chemical pressure-feeding means (not shown) continues feeding chemicals under pressure to cause the merged chemicals to pass through the inside of the housing 1 incorporating the drive rotor 2 and the driven rotors 3 and 3a which are rotating, while the mixing space 5 is filled with the merged chemicals, and flow toward the distal end in the housing 1. In this process, the total of three rotors, namely, the one drive rotor 2 and the two driven rotors 3 and 3a, efficiently mix the two types of chemicals, and efficiently promote curing of the mixture. This causes a chemical reaction to start curing. The cured resin is then pushed out of a discharge nozzle 7 attached to the distal end of the housing 1 and used for various applications.

The drive rotor 2 and the driven rotors 3 and 3a have shapes similar to those of internal elements of a so-called "static mixer." Making the rotors have such shapes will improve the agitation mixing efficiency for a mixture.

Preferably, the drive rotor 2 rotates in a direction opposite to the helical direction of the uppermost element (the counterclockwise helical element 21 in FIG. 6(a)), and the driven rotors 3 and 3a also rotate in a direction opposite to the helical direction of the uppermost element (the clockwise helical element 23 in FIG. 6(b)) accompanying the rotation of the drive rotor 2 so as to temporarily push the chemicals upward immediately after being injected into the housing 1, thereby preventing the occurrence of an air pocket in the upper portion of the mixing space 5 and also preventing the residual chemicals after stoppage of rotation from vigorously flowing out.

The rotary mixer according to the present invention is assumed to be used as a non-washable type that is removed and discarded after the completion of injection of a curable resin. However, the rotary mixer may be used as a washable type that is reused after washing.

A comparative experiment was conducted between the mixer (new mixer) according to the present invention and a conventional mixer.

The new mixer includes one drive rotor having five elements and two driven rotors each having five elements. Each rotor has a diameter of 6 mm and a length of 17.5 mm.

The conventional mixer used was "WONDER MIX SNP-M" available from Nippon Sosey Kogyo corporation as the present applicant (the main rotor with a diameter of 18 mm and a length of 52 mm).

Target objects to be mixed were two types of starch syrup solutions with a viscosity of 6.8 Pa·s, with one type of chemical being a starch syrup solution colored with iodine-potassium iodide solution, and the other chemical being a starch syrup solution in which sodium thiosulfate was dissolved. The supply amount of each type of solution was 0.25 cc/s. That is, the total supply amount was 0.5 cc/s.

The rotational speed of each mixer was 100 rpm. When a mixing process in each apparatus was visualized by a decolorization method, the new mixer completed mixing of the two types of solutions as the mixture became transparent near the inlets for the two solutions. In contrast to this, the conventional mixer did not complete mixing of the solutions because the iodine color slightly remained even at the outlet after the mixing operation.

In general, the laminar mixing in a mixer is evaluated by a dimensionless mixing time (the total number of revolutions as the product of the time until the completion of mixing and the number of revolutions of the apparatus). In this experiment, laminar mixing is evaluated by the same flow rate. If, therefore, laminar mixing is evaluated by same number of revolutions, mixing can be evaluated by the distance from the inlet in each mixer.

Accordingly, it can be concluded that the new mixer is superior to the conventional mixer.

The invention claimed is:

1. A rotary mixer fixed to a head portion of a multi-liquid mixture injection machine, wherein: one drive rotor and two driven rotors are accommodated parallel to each other in a housing, an upper opening portion of the housing is closed by a lid body, the housing has a mixing space that accommodates the drive rotor and the two driven rotors, the mixing space being formed with three cylindrical spaces, each of the three cylindrical spaces having a larger diameter than diameters of the drive rotor and the two driven rotors, the three cylindrical spaces being arranged in side by side and partially overlapping relation with one another, two chemical inflow paths are formed in an upper portion of the housing, an outflow path for a mixture is formed in a lower portion of the housing, the mixing space is formed so as to allow the drive rotor and the two driven rotors to rotate and to be able to regulate positions of the drive rotor and the two driven rotors, the drive rotor includes a drive rotor main body having a helical blade and a coupling portion integrally formed on an upper portion of the drive rotor main body and extending through the lid body, the two driven rotors each include a driven rotor main body having a helical blade, the helical blade is reversely rolled at the same pitch as a pitch of the helical blade of the drive rotor, the lid body closes an upper opening portion of the mixing space, a through hole for the coupling portion is formed in a center portion of the lid body, and the drive rotor is meshed with the two driven rotors to allow the two driven rotors to rotate in an opposite direction at fixed positions accompanying rotation of the drive rotor while a lower end of each of the two driven rotors is located above a bottom portion of the mixing space and an upper end of each of the two driven rotors is located below a lower surface of the lid body, a first of the two chemical inflow paths is formed so as to extend from an inlet in an outer side surface of the housing to an outlet opening at an upper part of a middle one of the three cylindrical spaces so as to allow a first chemical to be injected from above into an accommodation region in the mixing space for the drive rotor, and a second of the two chemical inflow paths is formed so as to extend from an inlet in the outer side surface of the housing to a downstream portion which branches into two separate and discrete flow passages defined by respective inner walls of the upper portion of the housing, the two separate and discrete flow passages having respective outlets disposed in the upper portion of the housing and opening at respective upper parts of outer ones of the three cylindrical spaces, disposed on opposite sides of the middle cylindrical space, so as to allow a second chemical to be injected from above into respective accommodation regions in the mixing space for the two driven rotors.

2. The rotary mixer according to claim 1, wherein the drive rotor main body and each driven rotor main body are formed by alternately and tandemly integrating clockwise helical elements and counterclockwise helical elements, with helical central axes being aligned with each other, and helical directions of the helical elements of the drive rotor main body and each driven rotor main body at the same level are opposite to each other.

3. The rotary mixer according to claim 2, wherein a rotating direction of the drive rotor is opposite to a helical direction of an uppermost one of the helical elements of the drive rotor.

4. The rotary mixer according to claim 1, wherein the upper portion of the housing is configured such that the two separate and discrete flow passages are obstructed from feeding the second chemical to the middle one of the cylindrical spaces.

5. The rotary mixer according to claim 1, wherein the respective inner walls of the upper portion of the housing are configured to prevent the two separate and discrete flow passages from feeding the second chemical to the middle one of the three cylindrical spaces.

6. The rotary mixer according to claim 1, wherein the two separate and discrete flow passages comprise respective grooves formed in the upper portion of the housing.

7. The rotary mixer according to claim 6, wherein the grooves extend along the upper portion of the housing in opposite directions from one another, each of the grooves having a downstream end terminating at the respective outlet.

8. The rotary mixer according to claim 1, wherein the first chemical inflow path comprises a flow passage defined by an inner wall of the upper portion of the housing and extending through the housing from the inlet of the first chemical inflow path in the outer side surface of the housing to the outlet, of the first chemical inflow path, the flow passage opening at the upper part of the middle one of the three cylindrical spaces.

9. The rotary mixer according to claim 8, wherein the second chemical inflow path comprises an upstream portion in communication with the downstream portion thereof, the upstream portion comprising an upstream flow passage extending through the upper portion of the housing from the inlet of the second chemical inflow path in the outer side surface of the housing to the downstream portion.

10. The rotary mixer according to claim 9, further comprising a diverting portion disposed in the upper portion of the housing to divert the second chemical flowing in the upstream portion of the second chemical inflow path into the two separate and discrete flow passages.

11. The rotary mixer according to claim 10, wherein the upper portion of the housing is configured such that the two separate and discrete flow passages are obstructed from feeding the second chemical to the middle one of the cylindrical spaces.

12. The rotary mixer according to claim 11, wherein the two separate and discrete flow passages comprise respective grooves formed in the upper portion of the housing by the respective inner housing walls of the upper portion of the housing.

13. The rotary mixer according to claim 12, wherein the grooves extend along the upper portion of the housing in opposite directions from one another, each of the grooves having a downstream end terminating at the respective outlet.

14. The rotary mixer according to claim 1, further comprising a diverting portion disposed in the upper portion of the housing to divert the second chemical flowing in the second chemical inflow path into the two separate and discrete flow passages.

* * * * *